Figure 1:
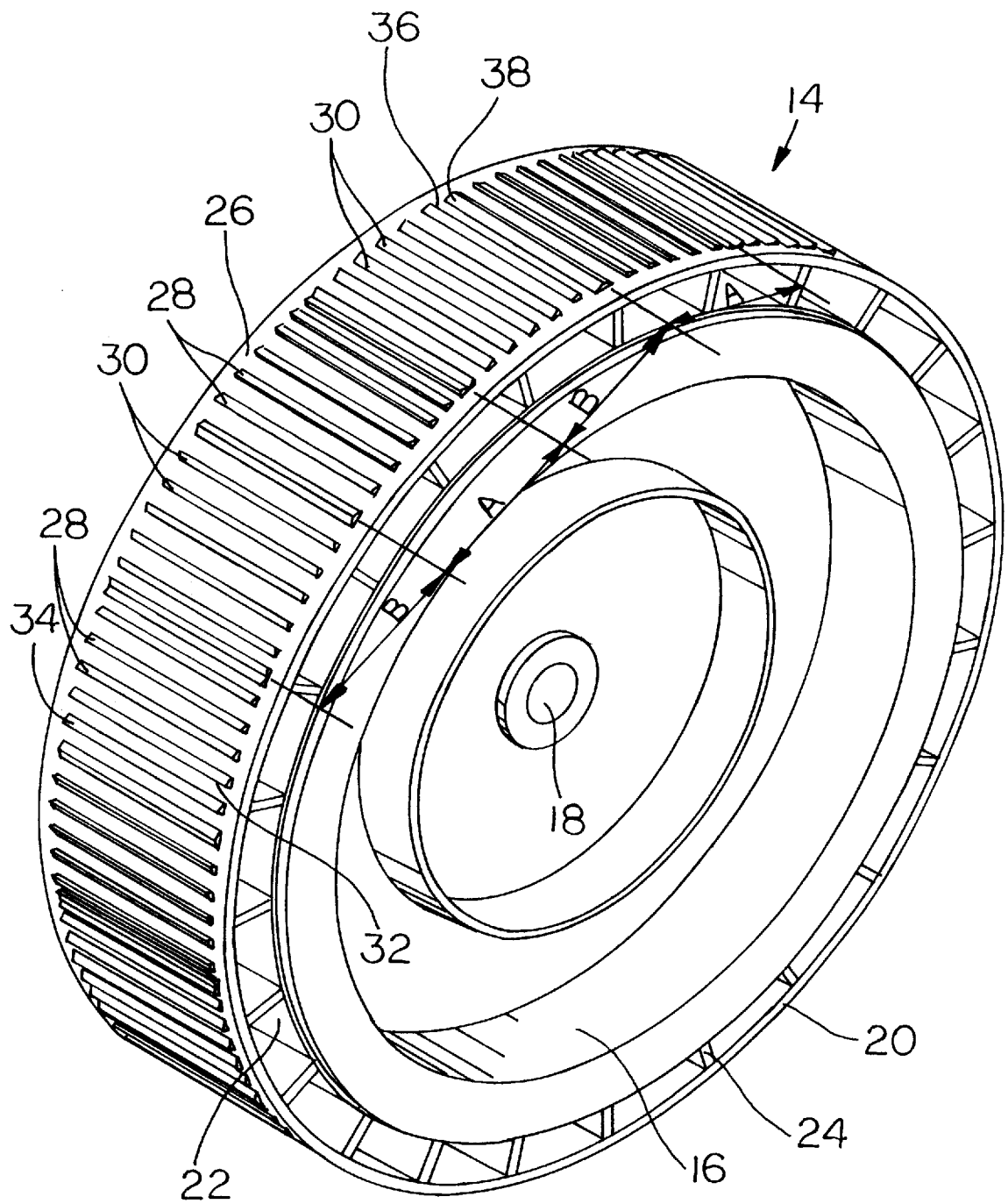

United States Patent [19]
Owen et al.

[11] Patent Number: 5,865,915
[45] Date of Patent: Feb. 2, 1999

[54] BI-DIRECTIONAL ANTI-SLIP DRIVE WHEEL ASSEMBLY

[75] Inventors: Robert H. Owen, Columbia City; Walter J. Creutz, Fort Wayne; Devlin J. Barnes, Winona Lake; Steven R. Laney; Bruce E. Harrison, both of Warsaw, all of Ind.

[73] Assignee: Spartech Industries, Inc., Warsaw, Ind.

[21] Appl. No.: 906,055

[22] Filed: Aug. 5, 1997

Related U.S. Application Data

[60] Provisional application No. 60/023,561 Aug. 7, 1996.

[51] Int. Cl.$^6$ ...................................................... B60C 7/00
[52] U.S. Cl. ............... 152/185.1; 152/384; 152/DIG. 18
[58] Field of Search .............................. 152/185.1, 384, 152/DIG. 18, 151; 321/97, 98

[56] References Cited

U.S. PATENT DOCUMENTS

| | | | |
|---|---|---|---|
| 580,164 | 4/1897 | Seiberling | 152/384 |
| 729,385 | 5/1903 | Morrison | 152/384 |
| 781,262 | 1/1905 | Xevers | 152/384 |
| 1,396,515 | 11/1921 | McClevey | 152/384 |
| 1,431,323 | 10/1922 | Muszynski | 152/384 |
| 1,534,574 | 4/1925 | Donat | 152/384 |
| 1,948,304 | 2/1934 | Maas | 152/384 |
| 1,949,501 | 3/1934 | Thacher | 152/384 |

*Primary Examiner*—Geoffrey L. Knable
*Attorney, Agent, or Firm*—Baker & Daniels

[57] ABSTRACT

A wheel assembly for small powered equipment including a wheel and a tire mounted on the wheel. The wheel has an outer circumferential surface and inclined cleats projecting from the outer circumferential surface. The cleats are arranged in sets of 6–7 cleats. Each set of cleats is inclined in a direction that alternates with the direction of the cleats in adjacent sets. The tire is provided with ribs along the inner circumferential surface that engage the edge of the cleats. Accordingly, regardless of which direction the tire is driven, slippage of the tire will occur only to a limited extent until the ribs of the tire engage with the edges of the cleats facing in the appropriate direction. Thereafter, rotation of the wheel in the same direction will not result in slippage between the tire and the wheel, and rotation in the opposite direction will result in only that degree of slip necessary to bring the ribs into engagement with the cleats of an adjacent set.

9 Claims, 3 Drawing Sheets

BI-DIRECTIONAL ANTI-SLIP DRIVE WHEEL ASSEMBLY

This application claims domestic priority based upon U.S. Provisional Patent Application Ser. No. 60/023,561, filed Aug. 7, 1996.

This invention relates to a drive wheel assembly for small powered equipment.

Small powered equipment, such as lawn and garden equipment, is often propelled by a small gasoline engine driving wheels through an axle upon which the wheels are non-rotatably mounted. The wheels commonly include a soft rubber tire mounted on a rim of a wheel assembly. Since the wheels are driven through the hub of the wheel and the tires are engaged with the ground, the hubs tend to slip relative to the tires. In order to avoid this slippage, it has been proposed in the prior art to secure the tires to the rim through a tongue and groove connection. However, this requires that the tongues be aligned with the grooves when the tire is installed on the rim during manufacture. The tire is installed on the rim during manufacturing when the tire is warm and flexible. The tire cools to a state in which it becomes very rigid, and cannot easily be adjusted relative to the rim. Accordingly, if the tire and rim are incorrectly aligned with the prior art tongue and groove construction, the tire and rim cannot be realigned after the tire has cooled. However, the diameter of the tire does not contract appreciably during cooling so that the tire may be able to slip relative to the rim when the wheel and tire assembly is installed on the power equipment.

According to the present invention, the outer surface of the rim is provided with multiple circumferentially spaced, radially projecting, axially extending sawtooth cleats on its outer periphery which are engaged by circumferentially spaced ribs provided on the inner circumferential surface of the tire. The cleats extend outwardly at an angle with respect to the rim. Different segments of the rim are provided with oppositely facing cleats. Accordingly, when the tire is installed on the rim, regardless of the direction in which the wheel is driven, the tire will only slip until the ribs engage the edge of the cleats. Accordingly, the initial alignment between the ribs and the cleats is not critical, since regardless of the alignment the ribs are but a short circumferential distance away from an edge of a cleat. After the tire slips this limited amount, no further slippage occurs.

Figure 2:
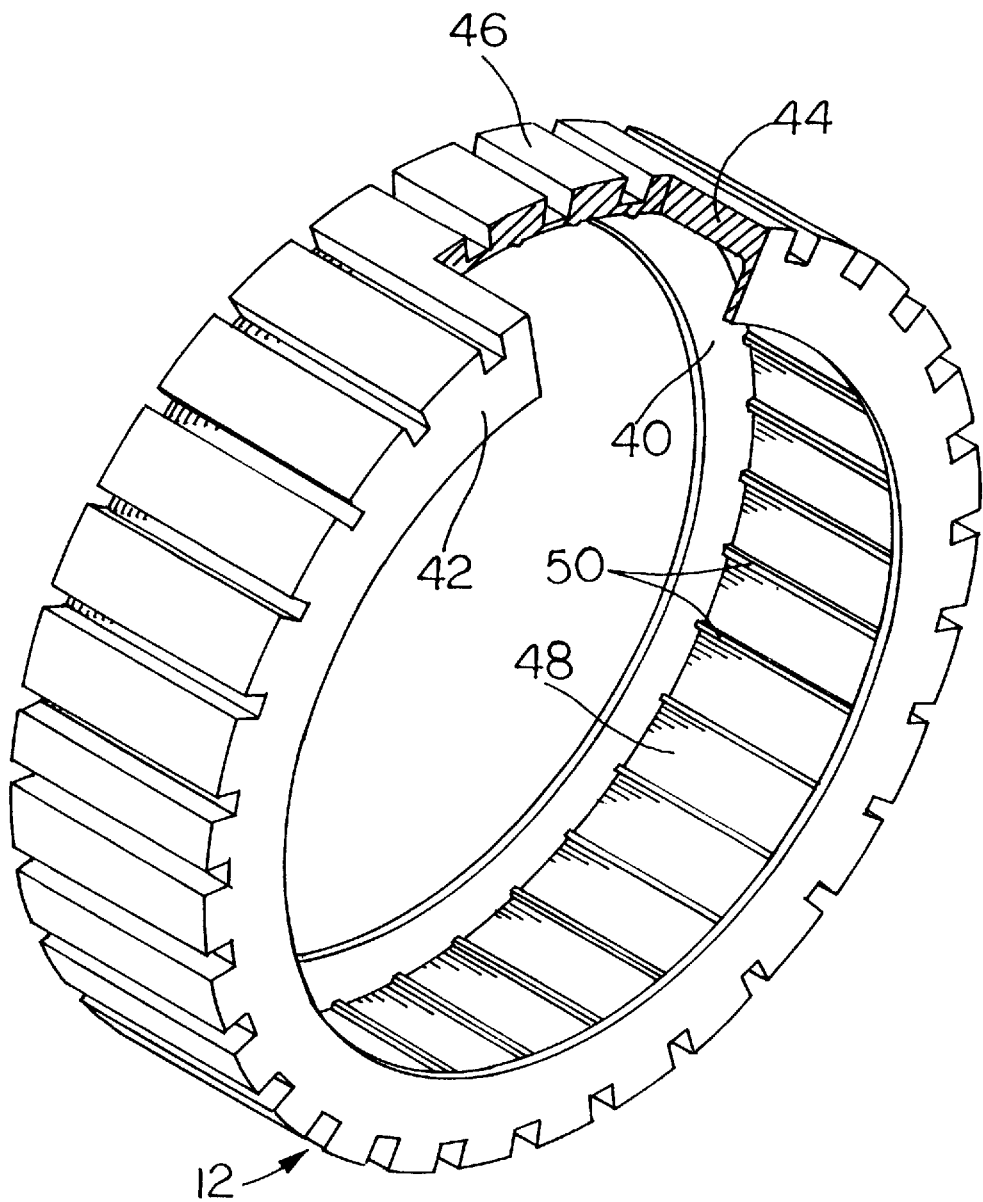
Figure 3:
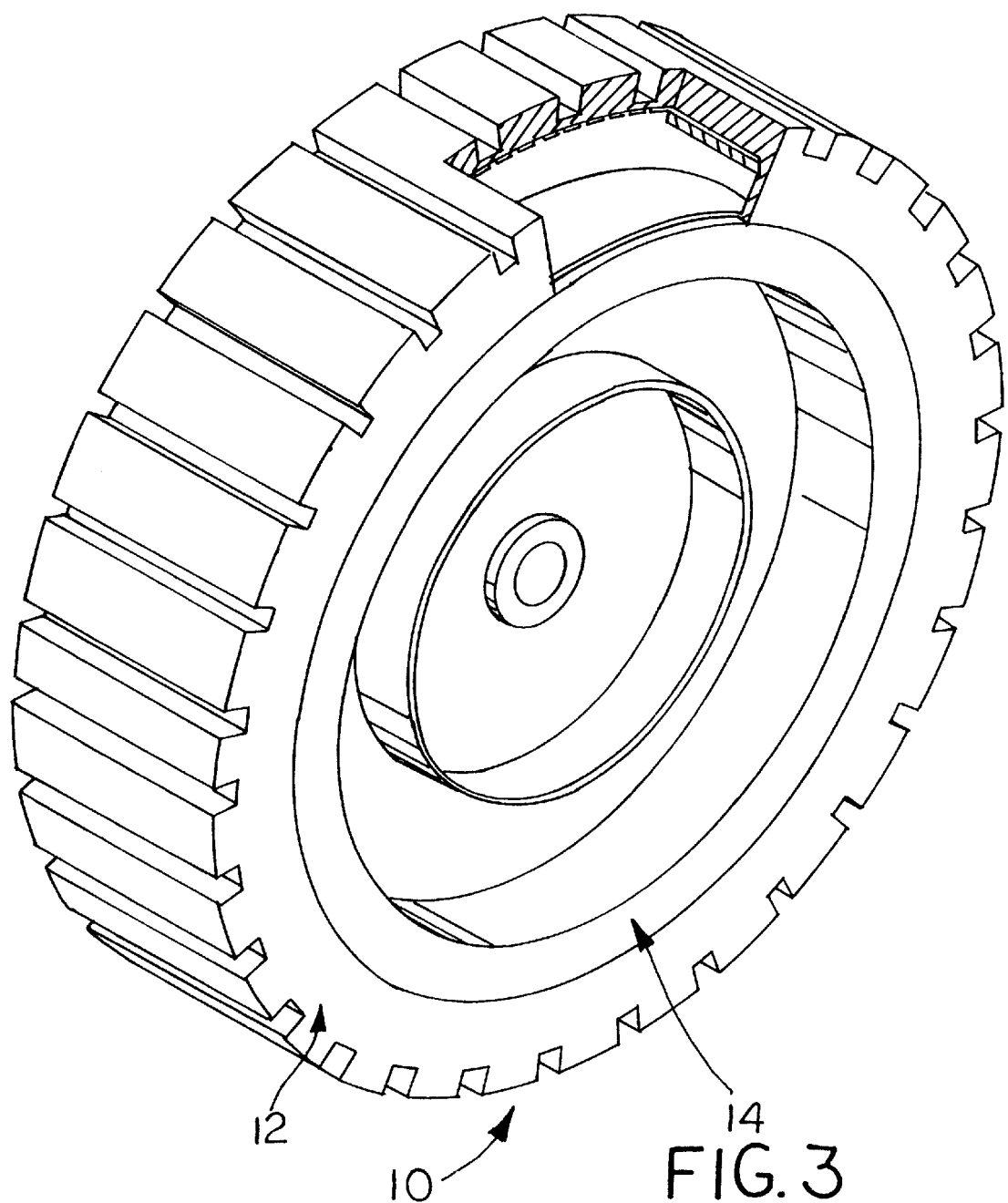

These and other advantages of the present invention will become apparent from the following description, with reference to the accompanying drawings, in which:

FIG. 1 is a view in perspective of a rim and hub assembly made pursuant to the teachings of the present invention, before the tire is installed thereon;

FIG. 2 is a view in perspective, with a portion cut away in cross section, illustrating a tire made pursuant to the present invention adapted for installation on the rim and hub assembly illustrated in FIG. 1; and FIG. 3 is a view in perspective of the tire illustrated in FIG. 2 installed on the rim and hub assembly illustrated in FIG. 1, with the portion of the periphery of both the tire and the rim and hub assembly cut away to show detail.

Referring now to the drawings, a wheel assembly generally indicated by the numeral 10 includes a tire 12 which is installed on a wheel generally indicated by the numeral 14. Wheel 14 includes a hub 16 through which an aperture 18 extends, which receives the axle (not shown) which drives the wheel 14. An outer rim 20 is mounted circumscribing the outer circumference 22 of the hub 16 by circumferentially spaced, radially extending, supports 24.

The rim 20 includes an outer circumferential surface 26. Circumferentially spaced, axially extending cleats 28 taper upwardly from the surface 26 and are angled in the counterclockwise direction (viewing FIG. 1). The cleats 28 are arranged in sets of 6–7 cleats as indicated by the segments labeled "A" in FIG. 1. Between each of the counterclockwise tapering cleats 28 are sets of clockwise tapering cleats 30, which are also arranged in sets of 6 or 7 and are indicated by the segments "B" in FIG. 1. As indicated in FIG. 1, the segments A and B alternate with one another. Aside from the direction of taper, the cleats 28, 30 are identical. As indicated in a drawing, each of the cleats 28 define an edge 32 at the end of the tapering portion 34 of each cleat. Similarly, the cleats 30 define an edge 36 between the tapering portion 38 of the cleats and the surface 26.

Referring now to FIG. 2, the tire 12 includes a pair of sidewalls 40, 42 and a circumferentially extending body 44 which defines the tread of the tire consisting of lugs 46 on the outer surface of body 44. The body 44 also defines an inner circumferential surface 48 which extends between a radially inwardly projecting sidewalls 40, 42. The inner surface 48 is provided with circumferentially spaced, axially extending, radially inwardly projecting ribs 50 which are spaced substantially evenly around the surface 48 and extend between the sidewalls 40 and 42.

The tire illustrated in FIG. 2 is made in the conventional manner in a heated mold and is installed on the rim 20 when the tire is still relatively warm and pliable. Accordingly, one of the sidewalls 40 or 42 may be deflected to permit the tire to slip over the edge of the rim. There is sufficient space between the cleats so that the ribs 50 are normally received within the spaces between the cleats; however, if the ribs rest upon the inclined surfaces of the cleats 28, 30 when the tire is initially installed on the rim, the ribs slide on these surfaces as the tire is adjusted slightly on the rim. Accordingly, when the wheel assembly 10 is installed on a vehicle, the ribs will be driven against the edges 32 or 36 of the cleats 28 or 30, depending upon the direction in which the wheel is driven. The wheel will slip relative to the rim for a relatively small distance to allow the ribs 50 to come into contact with the edges 32 or 36 of the corresponding cleats 28 or 30 depending upon the direction that the wheel is driven. As long as the wheel continues to be driven in the same direction, the tire cannot slip relative to the rim. It should also be noted that each of the cleats 28, 30 are punched out of the surface 26 by normal manufacturing processes, so that the hub and rim assembly 14 can be manufactured relatively inexpensively. The cleats 28, 30 thus form a sawtooth pattern that secures the tire to the rim regardless of the direction of which the wheel assembly 10 is driven.

Difficult problems of alignment which were inherent in prior are devices using a tongue and groove connection between the tire and the rim are eliminated by the present invention, because of the orientation of the tire relative to the rim in the present device is not critical. The ribs 50 will either engage the rim in a space between adjacent cleats, or will engage the sloping surfaces of the cleats. In the latter case, the ribs will slip down the surface into a space between the cleats and will be driven against the edge of the cleats after the wheel is installed on the vehicle and the vehicle is operated to drive the vehicle through the wheel assembly 10. Accordingly, the tire will slip only that limited distance equal to at most the distance between the cleats, until the ribs 50 engage the edges of the cleats. It will also be noted that only approximately one half of the ribs will be engaged with the edge of the cleats, since the direction of the cleats alternates as discussed above between the segments A and B. However, the segments A and B alternate around the circumference of the wheel, and the ribs are engaged at equally spaced sections of the wheel, assuring that the tire cannot slip relative to the wheel. In prior art devices, adjustment was impossible after the tire cools, because the tire cannot be flexed relative to the wheel after cooling. On the other hand, the diameter of the tire does not change appreciably as the tire cools, so that in the prior art devices incorrect installation of the tire on the rim meant that the tire would always slip relative to the rim when sufficient torque was applied between the rim and the tire. In the present invention, the tire can be installed in any orientation, and the slippage will be limited only to that amount necessary to bring the ribs 50 into engagement with the edges of the corresponding set of the cleats 28 or 30. Once the ribs are engaged with the edge of the cleats, no further slippage will occur, unless the wheels are dismounted from the vehicle and reinstalled in an orientation where torque is applied to the wheels in the opposite direction. If this should occur, the wheel and rim would slip only to a limited degree necessary to take up the clearance between the ribs 28 and 30 to drive the ribs 50 against the edges of the other set of cleats 28 or 30. Thereafter, the tire is again prevented from slipping relative to the rim.

What is claimed:

1. Wheel assembly rotatable about an axis comprising a wheel driven through an axle upon which the wheel is mounted and a deformable tire mounted on said wheel, said tire having and inner circumferential surface carrying projections, said wheel having an outer circumferential surface and cleats projecting from said outer circumferential surface said cleats defining an inclined surface angled upwardly from said outer circumferential surface and tapering circumferentially with respect thereto, each of said inclined surfaces terminating at an edge displaced from said outer circumferential surface and designed to engage said projections to prevent tire slippage, at least some of said inclined surfaces tapering in a circumferential direction relative to said outer circumferential surface opposite from the direction of taper of the inclined surfaces of the other cleats, whereby said tire is permitted to slip relative to said wheel and said projections are permitted to slide on said inclined surfaces and on said outer circumferential surface as the wheel is driven in a given direction until at least some of said projections engage corresponding edges of the cleats to thereby prevent slippage of the tire on the wheel as long as the wheel is driven in the given direction.

2. Wheel assembly as claimed in claim 1, wherein said cleats extend parallel to one another.

3. Wheel assembly as claimed in claim 2, wherein said cleats extend parallel to the axis of rotation of the wheel assembly.

4. Wheel assembly as claimed in claim 2, wherein said cleats are arranged in sets of multiple cleats, the cleats of each set having the same direction of taper, each of said sets of cleats being alternated with a set of cleats having an opposite direction of taper.

5. Wheel assembly as claimed in claim 1, wherein said ribs extend parallel to said axis.

6. Wheel assembly rotatable about an axis comprising a wheel driven through an axle upon which the wheel is mounted and a deformable tire mounted on said wheel, said wheel having an outer circumferential surface and abutments defining an inclined surface angled upwardly from said outer circumferential surface and tapering circumferentially with respect thereto, each of said inclined surfaces terminating at an edge displaced from said outer circumferential surface, at least some of said inclined surfaces tapering in a circumferential direction relative to said outer circumferential surface opposite from the direction of taper of the inclined surfaces of the other abutments, said tire having an inner circumferential surface having circumferentially spaced ribs engagable with said edges of the abutments upon circumferential slippage of said tire on said wheel to prevent further tire slippage whereby said tire is permitted to slip relative to said wheel as the wheel is driven and said ribs are permitted to slide oh said inclined surfaces of the abutments and on said outer circumferential surface until at least some of the ribs engage edges of corresponding abutments to thereby prevent further slippage of the tire on the wheel as long as the direction of rotation of the wheel remains unchanged.

7. Wheel assembly as claimed in claim 6, wherein each of said abutments extend substantially parallel to one another.

8. Wheel assembly as claimed in claim 7, wherein said abutments extend parallel to said axis.

9. Wheel assembly as claimed in claim 6, wherein said abutments are arranged in sets of multiple abutments, the abutments of each set having inclined surfaces projecting in the same direction, each of said sets of abutments being alternated with a set of abutments having inclined surfaces projecting in the opposite direction.

\* \* \* \* \*

UNITED STATES PATENT AND TRADEMARK OFFICE
CERTIFICATE OF CORRECTION

PATENT NO. : 5,865,915  
APPLICATION NO. : 08/906055  
DATED : February 2, 1999  
INVENTOR(S) : Owen et al.

Page 1 of 1

It is certified that error appears in the above-identified patent and that said Letters Patent is hereby corrected as shown below:

In Claim 1, column 3, line 30, delete "having and inner" and insert therefor -- having an inner --.
In Claim 6, column 4, line 30, delete "slide oh said" and insert therefor
-- slide on said --.

Signed and Sealed this

Eleventh Day of November, 2008

JON W. DUDAS  
*Director of the United States Patent and Trademark Office*